(12) United States Patent
Tam

(10) Patent No.: US 8,990,618 B2
(45) Date of Patent: Mar. 24, 2015

(54) PARTIAL FAULT TOLERANCE IN AN EMBEDDED APPLIANCE

(75) Inventor: Terry Tam, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 624 days.

(21) Appl. No.: 12/928,387

(22) Filed: Dec. 10, 2010

(65) Prior Publication Data

US 2012/0151256 A1   Jun. 14, 2012

(51) Int. Cl.
*G06F 11/00*   (2006.01)
*G06F 11/14*   (2006.01)

(52) U.S. Cl.
CPC .................................. *G06F 11/1417* (2013.01)
USPC ........................................................... 714/15

(58) Field of Classification Search
CPC ................ H04L 2012/5618; H04L 2012/563; H04M 2201/54; H04M 2207/203; H04M 3/42
USPC ........................................................... 714/15
See application file for complete search history.

(56) References Cited

U.S. PATENT DOCUMENTS

| | | |
|---|---|---|
| 7,000,231 B1 | 2/2006 | Gold |
| 7,024,581 B1 | 4/2006 | Wang et al. |
| 2002/0103981 A1 | 8/2002 | Smith et al. |
| 2004/0078680 A1 | 4/2004 | Hu et al. |
| 2005/0044548 A1* | 2/2005 | Page ............................. 718/100 |
| 2006/0085666 A1 | 4/2006 | Stakutis et al. |
| 2006/0112297 A1* | 5/2006 | Davidson .......................... 714/2 |
| 2007/0033387 A1 | 2/2007 | Arnez et al. |
| 2008/0177994 A1* | 7/2008 | Mayer ............................... 713/2 |
| 2009/0172114 A1* | 7/2009 | Srikanth et al. ............... 709/206 |
| 2009/0249284 A1* | 10/2009 | Antosz et al. ................. 717/104 |
| 2010/0088543 A1* | 4/2010 | Kambara et al. ................ 714/15 |
| 2010/0115004 A1 | 5/2010 | Liao |
| 2011/0302477 A1* | 12/2011 | Goss et al. ..................... 714/773 |

FOREIGN PATENT DOCUMENTS

| | | |
|---|---|---|
| EP | 1271322 A2 | 1/2003 |
| WO | WO 2009/109925 A2 | 9/2009 |

* cited by examiner

*Primary Examiner* — Jigar Patel

(57) ABSTRACT

A system and method for partial fault tolerance in an embedded appliance is disclosed. The method comprises providing an embedded appliance having first and second digital storage locations, with the second location including a boot manager and a recovery operating system. An image instance of the operational section of the first digital storage location can be copied at a selected frequency to a selected location on the second digital storage location. Files in the image instance can be re-mapped to operate at the second digital storage location. The embedded appliance can be rebooted from the second digital storage location using the boot manager to load an operating system in the image instance to operate the embedded appliance from the image instance at the selected location on the second digital storage location when the operational section of the first digital storage location is inaccessible.

15 Claims, 4 Drawing Sheets

PARTIAL FAULT TOLERANCE IN AN EMBEDDED APPLIANCE

BACKGROUND

The embedded/appliance system (E/A system) in the digital telephony industry is traditionally targeted for the Small and Medium Business (SMB) marketplace. This business space is characterized by low profit/high volume for sales for the vendors of the embedded/appliance telephony systems. To be successful in this marketplace, the telephony systems are typically designed to be low cost in terms of manufacturing and cost of ownership for the end customer. The systems are also designed to require a relatively low amount of support from the vendor.

If a customer requires fault tolerance for the data storage (e.g. hard drive) of an E/A telephony system, current implementations will include the use of a Redundant Array of Inexpensive Disks (RAID) system. With the small physical foot print of an E/A telephony system, there is usually only enough physical space for two 2.5 inch data storage devices. This will limit the implementation to a RAID 1 (mirror) type of system that can be used only for fault tolerance.

While RAID 1 is an effective method of protecting against a single drive failure, such failure has a very low probability of occurrence. The chance of a catastrophic hard drive failure that cannot be recovered by software is actually quite remote with the technology available today for enterprise rated drives. Typical hard drives available today for use in industrial applications have an unrecoverable error rate on the order of 1 in $10^{16}$, resulting in an average of 0.55% annual failures per year under normal environmental operating conditions. For a standard consumer grade hard drive, the unrecoverable error rate is 1 in $10^{14}$ with an annual failure rate of 0.5% under normal environmental operating conditions.

While the RAID system is useful in protecting against loss of data, the system precludes the use of the second storage device in an E/A telephony system from being used for other purposes. With the low probability of data loss, the second storage device may be of more use to a customer in reducing the cost of manufacturing, ownership, and support.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Figure 1:
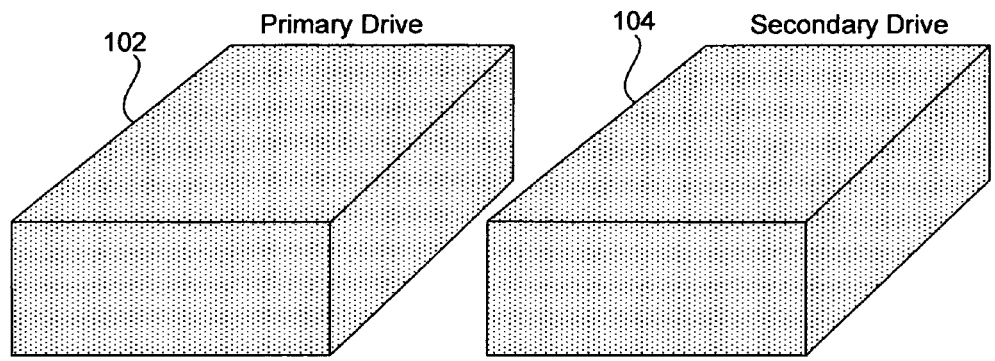
FIG. 1 illustrates a block diagram of a primary hard drive and a secondary hard drive configured in a redundant array of inexpensive disks (RAID) format.

An embedded appliance, such as a telephony server, an application server, and the like, that is designed for use by a small or medium sized business is typically designed to be compact and inexpensive. To meet these requirements, the telephony server may include only two separate digital storage devices, such as hard drives. The second hard drive is typically used as a Redundant Array of Inexpensive Disks (RAID) system that is setup as a mirror to provide a redundant backup for the data stored on the first digital storage device. For instance, FIG. 1 shows an example of a first hard drive 102 and a second hard drive 104. The two hard drives have substantially identical content. As data is created or copied onto the first drive, the data is mirrored on the second drive by the RAID system. If the first drive should fail then the data can be recovered on the second drive. However, using the second digital storage device to enable a RAID system eliminates the ability to use the second digital storage device for other purposes. Eliminating the RAID system and allowing the second digital storage device to be used for additional purposes may be of more benefit to a customer, as it can reduce the cost of manufacturing, ownership, and support for a digital telephony server or application server.

However, eliminating the RAID system does away with the ability to recover data on the slim chance of an occurrence of a fatal error of the first drive (i.e. a mechanical crash) or an unrecoverable read/write error (i.e. a software error). Many small and medium size businesses rely on the ability to recover data in the event of a catastrophic failure of the first hard drive on the server.

To overcome this limitation, a level of fault tolerance can be achieved by maintaining an image instance of the primary hard drive on the secondary hard drive. The space used on the primary hard drive for operational software (system software, application software, and data) is typically much less than the available storage space on the secondary hard drive.

For instance, in a voicemail system, such as the Mitel® NuPoint Messenger IP®, in an implementation for less than 50 users, the space used to store voicemail will typically have an upper bound of around 20 GB. A typical secondary hard drive can be configured to store on the order of 500 GB of data. When there is a catastrophic failure (hardware) on the primary drive, the server can be configured to attempt to automatically boot on the secondary hard drive and operate using an image instance of the operational software. If automatic reboot is not possible, a technician can manually boot for the last known snapshot via the boot manager on the second hard drive. This will be discussed in more details in the proceeding paragraphs.

Writing the image instance to the secondary hard drive provides significant advantages over storing the image instance on the primary hard drive. Writing the image instance to a partition on the primary hard drive can greatly reduce the primary hard drive throughput by a factor of 20 due to the random access seek penalties of the drive. Thus, the use of a secondary drive can significantly increase the speed at which the image instance can be created.

Figure 2:
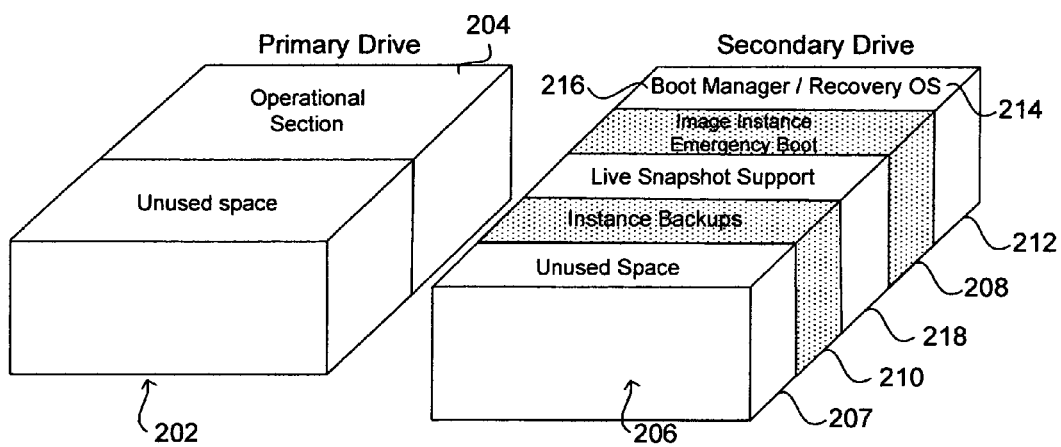
FIG. 2 illustrates a block diagram of a primary hard drive and a secondary hard drive configured to provide partial fault tolerance in a server in accordance with an embodiment of the present invention.

FIG. 2 provides a block diagram illustrating one example embodiment of the present invention. The system software (i.e. operating system), the application software used to operate the server, and any data that is used or created by the OS and application software can be stored in the operational section 204 of a primary hard drive 202. The operational section may be contained in a single partition or multiple partitions on the primary hard drive. When the primary hard drive is operational, the server uses the operational section of the primary hard drive to operate. Typically, all data, such as voice mail files, communication server databases, application databases, and other types of user and application data are stored in the operational section of the primary hard drive.

In one embodiment of the present invention, an image instance of the operational section can be copied to a selected location on the secondary drive 206. An image instance is a copy of the digital information in the operational section at a selected point in time. For example, an image instance of the operational section, as it exists on a certain day at 12:00 PM, may be copied to an image instance emergency boot partition 208 on the secondary hard drive 206.

In one embodiment, copying the image instance can be accomplished in a two step process. The image instance can first be copied in a non-compressed form to a dedicated partition, such as the image instance emergency boot partition 208. Once it has been copied, a background compression implementation can be used to compress the image instance into one or more compressed file(s). The compressed files can be copied into a separate backup partition on the secondary drive 206, such as the instance backup partition 210.

In another embodiment, an image instance of the operational section 204 of the primary hard drive 204 can be directly compressed and stored in the instance backup partition 210 of the secondary hard drive 206. Once compressed, the background compression implementation can uncompress the instance image and store a copy of the uncompressed image in the image instance emergency boot partition 208. This embodiment can be used if the partition size on the primary hard drive 202 in which the operational section 204 is stored is larger than the partition size of the image instance emergency boot partition 208 on the secondary hard drive 206.

If the operational section 204 includes more than one partition then the steps above can be repeated. An image instance can be created for each partition in the operational section. The image instance can be compressed and stored on the secondary hard drive. Each instance from the operational section 204 can then be expanded in the image instance boot partition.

In one embodiment, the image instance emergency boot partition 208 can be split into sub-partitions to match with the partitions of the operational section 204. Alternatively, the partitions in the operational section may be flattened and the image instances in each partition in the operational section can be expanded into a single partition, such as the image instance emergency boot partition.

The mount information can then be adjusted to allow the partition to be valid. For instance, in a Linux operating system the system configuration file in the file systems table, commonly implemented as /etc/fstab can be adjusted. The system configuration file can list all available disks and disk partitions. Information can also be included in the system configuration file indicating how the available disks and disk partitions are to be initialized or otherwise integrated into the overall system's file system.

Once the image instance(s) from the operational section 204 have been copied to the image instance emergency boot partition 208 and expanded, a single flat partition for the image instance emergency boot can be used. In this example, the swap partition can be disabled. Disabling the swap partition is acceptable since the use of the files under the image instance emergency boot partition is only a temporary solution until a new primary hard drive can be installed or repaired in the server. For real-time applications, systems are allocated so that real memory is enough so that the swap partition is not used. In some situations software applications may require licensing to operate. If necessary, the licensing information can be adjusted to allow the software in the image instance emergency boot partition to be valid, as can be appreciated.

In one embodiment, selected applications and data contained in the operational section 204 may not be necessary to copy. Much of the data on the primary hard drive may not be required when running the server in an emergency mode. In general, the server will run in emergency mode using the image instance in the image instance emergency boot partition 208 only long enough for a technician to replace the damaged primary hard drive 202 or correct the hardware or software problem that kept the server from accessing the operational section 204 of the primary hard drive. Thus, existing files in the operational section such as logs, core files, installation files, and temporary files may be omitted when creating an image instance to place in the image instance emergency boot partition on the secondary hard drive.

Depending on the type of operating system that is used on the primary drive 202, the drive mapping of selected files in the image instance may need to be changed. In one example embodiment, once the image instance has been placed in the image instance emergency boot partition 208, the drive mappings can be changed to enable the operating system and application software to operate on the secondary hard drive 206. For instance, in a Linux Operating System, the drive mappings can be changed by updating the system configuration file in the file systems table that typically lists all available disks and disk partitions, and indicates how they are to be initialized or otherwise integrated into the overall system's file system. The system configuration file can be updated to list the available secondary disk.

Alternatively, a compressed image instance from a specific time can be placed in the image instance emergency boot partition and uncompressed. The uncompressed image instance can then be remapped as needed to allow the software to operate on the secondary hard drive 206.

The secondary hard drive 206 can include a boot manager 216 and a recovery operating system (OS) 214. In one embodiment, the boot manager and recovery OS can be located in a separate partition 212 on the secondary hard drive. However, it is not necessary to locate the boot manager and recovery OS in a separate partition.

In another embodiment, the image instance in the image instance emergency boot partition 208 may not be remapped each time an image instance is copied into the partition. Instead, an application, such as an application run by the recovery OS 214, can be used to remap the software in the image instance that is located in the image instance emergency boot partition 208. The application can be run when the recovery OS is used in the event of a crash or failure of the primary hard drive 204. This reduces the need to update the mapping of the image instance each time it is copied.

When the operational section 204 on the primary hard drive 202 becomes inaccessible, the server can be configured to operate using an image instance of the operational section that is located on the secondary hard drive 206.

The secondary hard drive can further comprise unused space 207. As previously discussed, modern hard drives have a very large amount of storage space. The unused space on the secondary drive can include additional partitions and/or uses beyond what is shown in FIG. 2 and described above.

Figure 3:
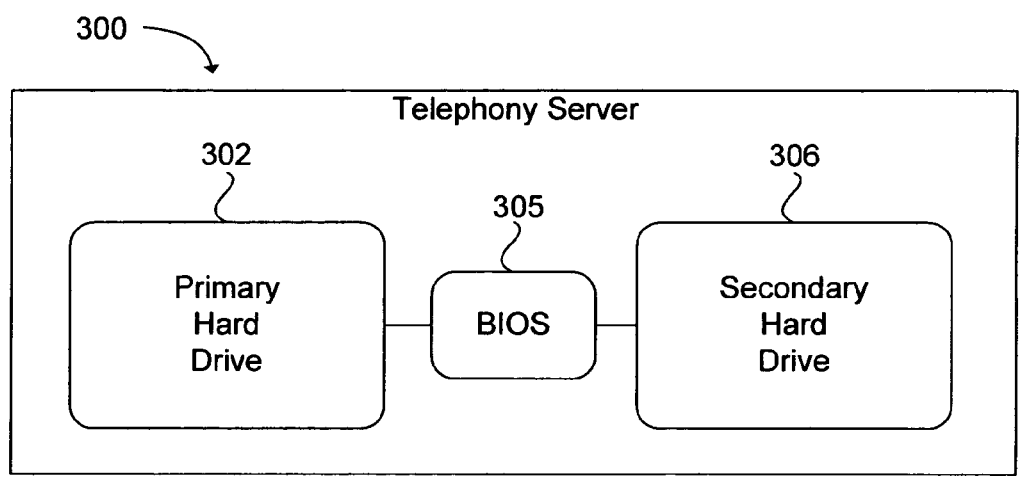
FIG. 3 illustrates a block diagram of the server of FIG. 2 in accordance with an embodiment of the present invention.
Figure 4:
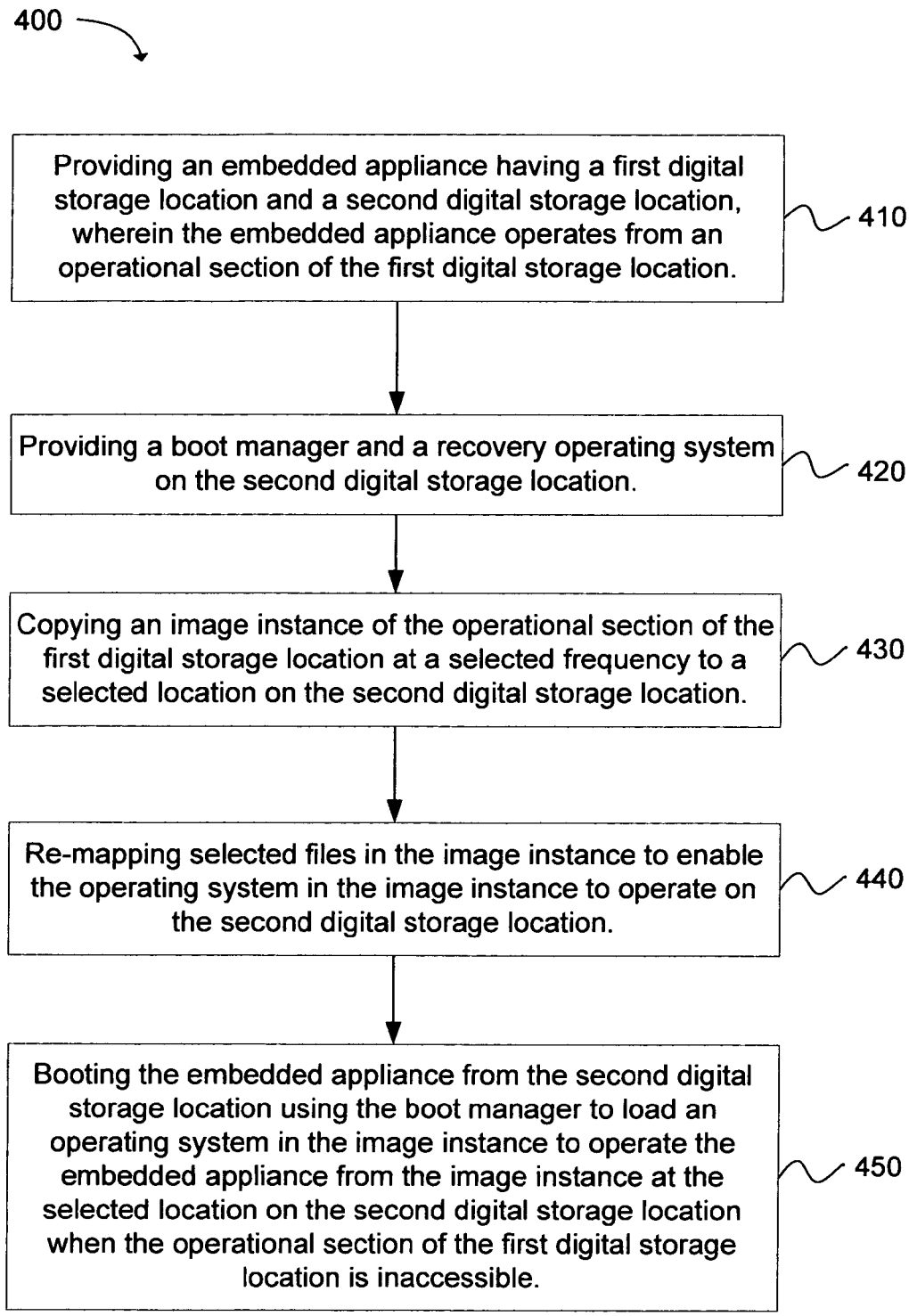
FIG. 4 depicts a flow chart of a method for partial fault tolerance in a server in accordance with an embodiment of the present invention.

FIG. 3 is a block diagram illustrating one example of a server 300 having a primary hard drive 302 and a secondary hard drive 306. The hard drives are typically connected to a Basic Input/Output System (BIOS) 305. The BIOS may be replaced by an extensible firmware interface (EFI) or other type of interface that is configured to start the operating system. The BIOS typically provides a small library of basic input/output functions used to operate and control the peripherals such as the hard drives, keyboard, text display functions and so forth. When the server is first powered on, the BIOS is configured to use a boot manager on the primary hard drive to run the operating system and applications in the operational section of the primary hard drive 302 to operate the server.

The operational section of the primary hard drive 302 may become inaccessible for at least two reasons. First, a mechanical failure of the primary hard drive may occur. When the mechanical failure occurs, the result may be that the BIOS 305 may no longer recognize that the primary hard drive is present in the server.

A second reason the operational section may become inaccessible is due to the inability of the primary hard drive 302 to access the information stored in the operational section. The hard drive may not be able to access the information in the operational section due to software problems, read/write errors on the hard drive, or problems with the magnetic surface of the hard drive. Additional problems may also disable the hard drive's ability to access the operational section, such as problems with the motherboard, power supply, and so forth, as can be appreciated.

When the primary hard drive 302 is still operating, but the information on the hard drive is inaccessible, the BIOS may still recognize the primary hard drive and attempt to boot to the primary hard drive. Since the information cannot be accessed, the operating system may not load properly, resulting in the inoperability of the server 300.

When the operational section on primary hard drive 302 becomes inaccessible, the server 300 can be rebooted. If the inaccessibility is caused by a hardware failure, wherein the primary hard drive is not recognized by the BIOS 305, then the BIOS in the server can be configured to automatically boot on the secondary drive 306 using the boot manager.

Returning to FIG. 2, the boot manager 216 on the secondary hard drive 206 can load the operating system in the image instance stored on the secondary hard drive 206 to operate the desired application software that is also included in the image instance. In one embodiment, the boot manager can be configured to use the image instance stored in the image instance emergency boot partition 208 as the default partition. This enables the server to quickly recover from a catastrophic failure of the primary hard drive. Simply rebooting the server can enable the server to operate in an emergency mode on an image instance that was copied to the secondary hard drive until a technician is able to restore or replace the primary hard drive's functionality When the primary hard drive's 202 failure is due to a software error, read/write error, or problems with the magnetic surface of the hard drive that keep the data in the operational section 204 from being accessed, the BIOS 305 (FIG. 3) may still recognize the primary hard drive 202 even though the desired data cannot be read. In this case, a technician can manually use the BIOS to reboot the server using the boot manager 216 on the secondary hard drive 206 to load the operating system in the selected image instance. The technician can accomplish this either remotely or on-site. The operating system can then be used to run the system software, application software, and access the data in the image instance that was copied to the secondary drive 206, as previously discussed.

When the operational section 204 on the primary hard drive 202 becomes inaccessible, a technician can be alerted to the problem. The technician can repair or replace the primary hard drive 202. The image instance(s) stored on the secondary hard drive 206 can then be used to restore the operational section on the primary hard drive to an operating condition. This can be accomplished by instructing the boot manager 216 on the secondary hard drive to load the recovery operating system 214. The recovery operating system can be used to copy an image instance from the secondary hard drive 206 to the primary hard drive to restore the operational section.

In one embodiment, the last image instance of the operational section 204 that was copied to the secondary drive can be located in the image instance emergency boot partition 208. The technician can use this last image instance to enable the operational section to be restored with the most up to date data available. For instance, the image instance emergency boot partition 208 may contain an image instance of the operational section as it existed after a company's closing time on the prior day.

In another embodiment, the technician may desire to restore a different image instance of the operational section than the most current copy. This may be needed, for example, if the data became corrupted or a software upgrade did not work properly. In this case, the technician may select a desired image instance from the instance backup partition 210. The desired image instance may have been compressed using a lossless data-compression algorithm such as the Lempel-Ziv-Oberhumer (LZO) algorithm or another type of lossless data compression. The compressed data may need to be uncompressed into the image instance emergency boot prior to restoring it to the primary hard drive 202. Alternatively, the compressed image may be copied to the primary hard drive and then uncompressed.

Once the image instance has been copied from the secondary hard drive 206 to the primary hard drive 202 and uncompressed, if necessary, the drive mapping of selected files in the image instance may need to be changed to allow the software to operate on the primary hard drive. If the files in the image instance were previously remapped to operate on the secondary hard drive 206 then the same process that was previously discussed can be used to remap the selected files to again operate on the primary hard drive 204.

In one embodiment, only the image instance stored in the image instance emergency boot partition may be remapped. The image instance(s) stored in the instance backup partition 210 may not be remapped. Thus, if the image instance is restored from the instance backup partition 210 to the primary hard drive 204 then no remapping may be needed.

In another embodiment, the server may operate for an extended period of time from an image instance, such as the image instance stored in the image instance emergency boot partition 208, before a technician is able to fix or replace the primary hard drive 204. This period of time may last up to several hours of time, or even longer depending on the availability of a technician. During the time that the server is operating from an image instance on the secondary hard drive 208 a significant amount of data may be recorded. The recorded data from the secondary hard drive can be copied to the primary hard drive after an image instance has been restored to enable the primary hard drive to include the most recent data.

Once the image instance has been restored to the primary hard drive 204 then the server can then be rebooted and the BIOS can boot from the primary hard drive and use the information in the operational section 204. The operational section of the primary drive can then be used to operate the server. Thus, not only can the image instance of the operational section be used to operate the server when the primary hard drive fails. Once the primary hard drive has been fixed or replaced, the image instance can also be used to restore operational section to the primary hard drive and enable the server to operate normally.

In one example implementation, the server 300 (FIG. 3) can be configured to operate using a Linux operation system such as the Mitel Standard Linux Operating System. Linux has a built in live snapshot mechanism referred to as a Logical Volume Manager (LVM) that enables an image instance to be created while the server is operating. The LVM snapshot mechanism is a Copy on Write (COW) mechanism that keeps track of all of the block deltas of a write in a separate partition. In one embodiment, the partition can be created on a separate hard drive, such as the live snapshot support partition 218 on the secondary hard drive 206. Writing the block deltas to a partition on the primary hard drive can greatly reduce the primary hard drive throughput by a factor of 20 due to the random access seek penalties of the drive. Therefore, they are written to the secondary hard drive 206. The block deltas can be used to track any changes that occur to the operational section 204 of the primary hard drive 202 after the creation of the image instance (live snapshot) has started. Any changes can be removed from the image instance, allowing the operational section to be copied as it existed at a selected moment in time.

The snapshot backup can either be invoked manually via a user interface or performed via a scheduled snapshot backup mechanism. When a snapshot is performed, a number of operations can occur. An event can be sent to operating software applications on the primary hard drive 202. The event can ensure that all dependent data is synchronized. An operating system sync command can be issued to ensure that file buffers are flushed. The LVM snapshot partition can be setup and a snapshot of the root partition on the primary hard drive 202 can be created. The boot partition can be backed up using a Tar (tape archiver) system and LZO compression to create a file on the instance backup partition 210. It should be noted that the boot partition can be a regular partition containing a GRand Unified Bootloader (GRUB) boot manager that does not require special treatment by the LVM. The contents of this partition typically do not change in runtime. Changes are only made during an upgrade. System backups do not typically occur during a system upgrade operation.

The snapshot root partition containing the MSL operating system, Mitel Applications Suite software, and Mitel Communications Director software can be backed up using Tar and LZO compression to the instance backup partition 210. Once the backup is complete, the live snapshot support partition 218 can be released. A background task can then expand the backup into the image instance emergency boot partition 208 and strip out irrelevant information such as logs, temp files, core files, and so forth that are not needed for an emergency boot situation. The boot partition mount in the root partition can then have the links resolved in the image instance emergency boot partition. This can be accomplished by copying the contents of the boot partition on the primary hard drive to a "/boot" directory in the image instance emergency boot partition.

In one embodiment the server 300 (FIG. 3) may not be field serviceable. That is, if the primary hard drive fails then a new server may be used to replace the server with a failed hard drive rather than attempting to repair the server in the field. If this occurs then the image instance from the secondary hard drive in the original server may be copied to the secondary hard drive in the new server using, for example, a network connection to both servers, or an external USB memory device to transfer the image instance. A technician can then use the boot manager 216 and recovery OS 214 to copy the image instance to the primary drive over the original operational section. Thus, the image instance on the secondary hard drive can be copied to a new server to enable the new server to operate just as the damaged server did at the time the image instance was created.

The ability to restore an image instance of the operational section from the secondary hard drive 306 to the primary hard drive 302 in a server 300, and operate from the restored operational section, can provide significant additional advantages to a customer. In one example embodiment, a customer can perform upgrades on multiple servers by making an upgrade to a single server and copying an image instance of the operational section having the upgrade. The image instance of the operational section can then be copied to the secondary hard drives of the servers that are desired to receive the upgrade. The image instance can be "restored" to the primary hard drive on each server to replace the server's original operational section, as previously discussed. The ability to perform upgrades in this manner can be substantially faster and more uniform than if each server was individually upgraded.

For instance, a server dealer may sell 100 servers to company X to be installed by a dealer. Dealer A discovers that each installation requires a special dialing plan for the new region. Individually setting up the special dialing plan on each server can take an extra 20 minutes per server, or over 33 hours.

To reduce this time, the installation may be performed on the first server and the special dialing plan can be setup. Any licensing that may exist on the system can be removed and the system can be reset to an initial provisioning state, if necessary. The temporary files can be removed and the log system can also be cleaned to an initial state. An image instance of the operational section can then be taken and copied to the secondary drives of each of the 99 remaining servers. The time to copy the image instance can be on the order of 2-4 minutes, depending on the amount of data. The technician installing the servers can then boot from the secondary hard drive and use the recovery OS to restore the image instance to the primary hard drive. The restoration may take on the order of 4-5 minutes. Thus, the ability to use the image instance to update the software on each server can save approximately 11-14 minutes per server, or 18 hours to 23 hours for the total installation. In addition, the use of the image instance significantly reduces the possibility of a technician incorrectly setting up the special dialing plan on one or more of the 100 servers due to typing mistakes or other forms of technician error. This can provide significant savings and a potential increase in productivity for the customer that purchases the servers.

In addition, the task of updating the additional 99 systems can be accomplished at the dealer's lab before going to the customer site. The dealer can typically employ a lower skilled worker to copy the files onto the 99 systems. Thus, a skilled technician is only needed to create the initial image instance. A lower skilled worker can then update the remaining systems, thereby significantly reducing labor costs and reducing the amount of time the technician spends on-site to install the servers. This example is not intended to be limiting. A wide number of alterations or upgrades may be performed on to the software in the operational section of a primary drive and transferred to other servers to allow them to be updated the same.

In another embodiment, a method 400 for partial fault tolerance in an embedded appliance is disclosed. The method comprises providing 410 an embedded appliance having a first digital storage location and a second digital storage location. The first and second digital storage locations can comprise a first digital hard drive and a second digital hard drive, respectively. Alternatively, the first and second digital storage locations may be located on one or more solid state drives or other types of digital memory such as a holographic digital storage device, magnetic random access memory, memristive random access memory, and so forth.

The embedded appliance can operate from an operational section of the first digital storage location. The operational section can include one or more sectors or partitions. The operational section can contain all of the software needed for the embedded appliance to operate once it has been booted up, including system software such as the operating system, application software, and data.

The method 400 further comprises providing 420 a boot manager and a recovery operating system on the second digital storage location. The boot manager and recovery operating system may be stored in a predetermined partition of the second digital storage location. Alternatively, the boot manager and recovery OS may be located in separate partitions. An image instance of the operational section on the first digital storage location can be copied 430 at a selected frequency to a selected location on the second digital storage location. The image instance is a copy, at a selected instance in time, of the entire contents of the operational section, including the system software such as the operating system, the application programs, and the data. The copy can be updated at the selected frequency, such as once a day, several times per day, once a week, and so forth. The frequency of the copy can be determined by the system design and the needs of the customer. For example, if frequent data changes occur in the telephony system then the operational section can be copied more frequently, or according to any other desired schedule.

The method 400 further includes re-mapping 440 selected files in the image instance to enable the operating system in the image instance to operate on the second digital storage location and booting 450 the embedded appliance from the second digital storage location using the boot manager to operate the telephony sever from the image instance stored at the selected location on the second digital storage device when the operational section of the first digital storage location is inaccessible.

Figure 5:
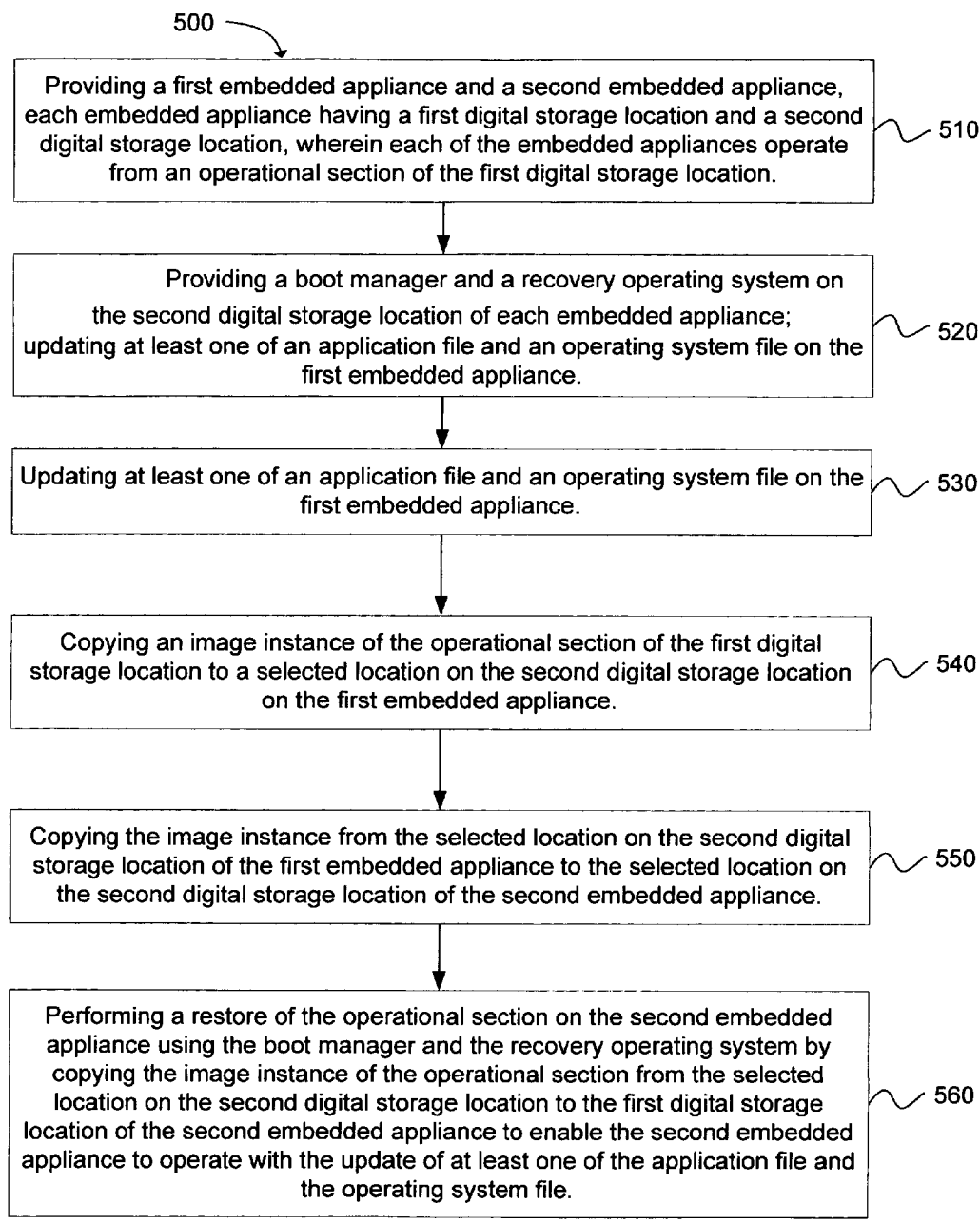
FIG. 5 depicts a flow chart of a method for updating software applications on a server in accordance with an embodiment of the present invention.

In another embodiment, a method 500 for updating software applications on an embedded appliance is disclosed, as depicted in the flow chart of FIG. 5. The method comprises providing a first embedded appliance and a second embedded appliance. Each embedded appliance has a first digital storage location and a second digital storage location. The embedded appliance operates from an operational section of the first digital storage location. A boot manager and a recovery operating system are provided 520 on the second digital storage location of each embedded appliance.

The method 500 further comprises updating 530 at least one of an application file and an operating system file on the first embedded appliance. For instance, a selected application on the embedded appliance may be updated to the newest version. An image instance of the operational section of the first digital storage location can then be copied 540 to a selected location on the second digital storage location on the first embedded appliance. The image instance can then be copied 550 from the selected location on the second digital storage location of the first embedded appliance to the selected location on the second digital storage location of the second embedded appliance.

The method 500 further includes performing 560 a restore of the operational section on the second embedded appliance by copying the image instance of the operational section from the selected location on the second digital storage location to the first digital storage location of the second embedded appliance using the boot manager and the recovery operating system to enable the second embedded appliance to operate from it's primary drive with the update of at least one of the application file and the operating system file.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de-facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for partial fault tolerance in a telephony server, comprising:
providing a telephony server, having only a first digital storage location and a second digital storage location, wherein the telephony server operates from an operational section of the first digital storage location;
providing a boot manager and a recovery operating system on the second digital storage location;
copying an image instance of the operational section of the first digital storage location at a selected frequency to a selected location on the second digital storage location;
re-mapping selected files in the image instance to enable the operating system in the image instance to operate on the second digital storage location;
providing at least one additional partition on the second digital storage location which is not used for storing an image instance of the operational section of the first digital storage location, such that the second digital storage location can be used for additional purposes;
booting the telephony server from the second digital storage location using the boot manager to load an operating system in the image instance to operate the telephony server from the image instance at the selected location on the second digital storage location when the operational section of the first digital storage location is inaccessible; and
performing a restore of the operational section by copying the image instance of the operational section from the selected location on the second digital storage location to the first digital storage location while operating the telephony server from the second digital storage location to enable the telephony server to operate from the first digital storage location.

2. The method of claim 1, further comprising providing telephony server, wherein the first digital storage location and the second digital storage location are each a separate magnetic hard disk drive operating in the telephony server.

3. The method of claim 1, further comprising providing the telephony server, wherein the first digital storage location and the second digital storage location are separate locations on at least one solid state drive operating in the telephony server.

4. The method of claim 1, further comprising copying the image instance of the operational section of the first digital storage location to the selected location on the second digital storage location, wherein the selected location is an image instance emergency boot partition on the second digital storage location.

5. The method of claim 4, further comprising copying the image instance of the operational section of the first digital storage location to the image instance emergency boot sector on the second digital storage location while the telephony server is operating from the operational section of the first digital storage location.

6. The method of claim 1, further comprising storing a plurality of temporally distinct image instances of the operational section from the first digital storage area on the second digital storage location.

7. The method of claim 6, further comprising restoring a previous version of the operational section by copying one of the temporally distinct image instances of the operational section from the second digital storage location to the first digital storage location to replace the operational section on the first digital storage location.

8. The method of claim 1, further comprising compressing the plurality of temporally distinct image instances and storing the compressed temporally distinct image instances in a separate partition on the second digital storage location.

9. A computer program product, comprising a non-transitory machine-readable storage medium having a computer readable program code embodied therein, said computer readable program code adapted to be executed to implement a method for partial fault tolerance in a telephony server, comprising:
providing a telephony server, having a first digital storage location and a second digital storage location, wherein the telephony server operates from an operational section of the first digital storage location;
providing a boot manager and a recovery operating system on the second digital storage location;
copying an image instance of the operational section of the first digital storage location at a selected frequency to a selected location on the second digital storage location;
re-mapping files in the image instance to operate on the second digital storage location;
providing at least one additional partition on the second digital storage location which is not used for storing an image instance of the operational section of the first digital storage location, such that the second digital storage location can be used for additional purposes;

booting the telephony server from the second digital storage location using the boot manager to load an operating system in the image instance to operate the telephony server from the image instance at the selected location on the second digital storage location when the operational section of the first digital storage location is inaccessible; and performing a restore of the operational section by copying the image instance of the operational section from the selected location on the second digital storage location to the first digital storage location while operating the telephony server from the second digital storage location to enable the telephony server to operate from the first digital storage location.

10. The computer program product of claim 9, further comprising providing the telephony server, wherein the first digital storage location and the second digital storage location are each a separate magnetic hard disk drive operating in the embedded appliance.

11. The computer program product of claim 9, further comprising providing the telephony server, wherein the first digital storage location and the second digital storage location are separate locations on at least one solid state drive operating in the telephony server.

12. The computer program product of claim 9, further comprising copying the image instance of the operational section of the first digital storage location to the selected location on the second digital storage location, wherein the selected location is a image instance emergency boot partition on the second digital storage location.

13. The computer program product of claim 9, further comprising copying the image instance of the operational section of the first digital storage location to the image instance emergency boot sector on the second digital storage location while the telephony server is operating from the operational section of the first digital storage location.

14. The computer program product of claim 9, further comprising storing a plurality of temporally distinct image instances of the operational section from the first digital storage area on the second digital storage location.

15. The computer program product of claim 14, further comprising restoring a previous version of the operational section by copying one of the temporally distinct image instances of the operational section from the second digital storage location to the first digital storage location to replace the operational section on the first digital storage location.

* * * * *